July 21, 1959  J. J. KUESER  2,896,062
COFFEE MAKER AND THERMOSTAT CONSTRUCTION THEREFOR
Filed March 12, 1956  2 Sheets-Sheet 1

Inventor
John J. Kueser
by Bair, Freeman & Molinare
Attorneys

July 21, 1959 J. J. KUESER 2,896,062
COFFEE MAKER AND THERMOSTAT CONSTRUCTION THEREFOR
Filed March 12, 1956 2 Sheets-Sheet 2
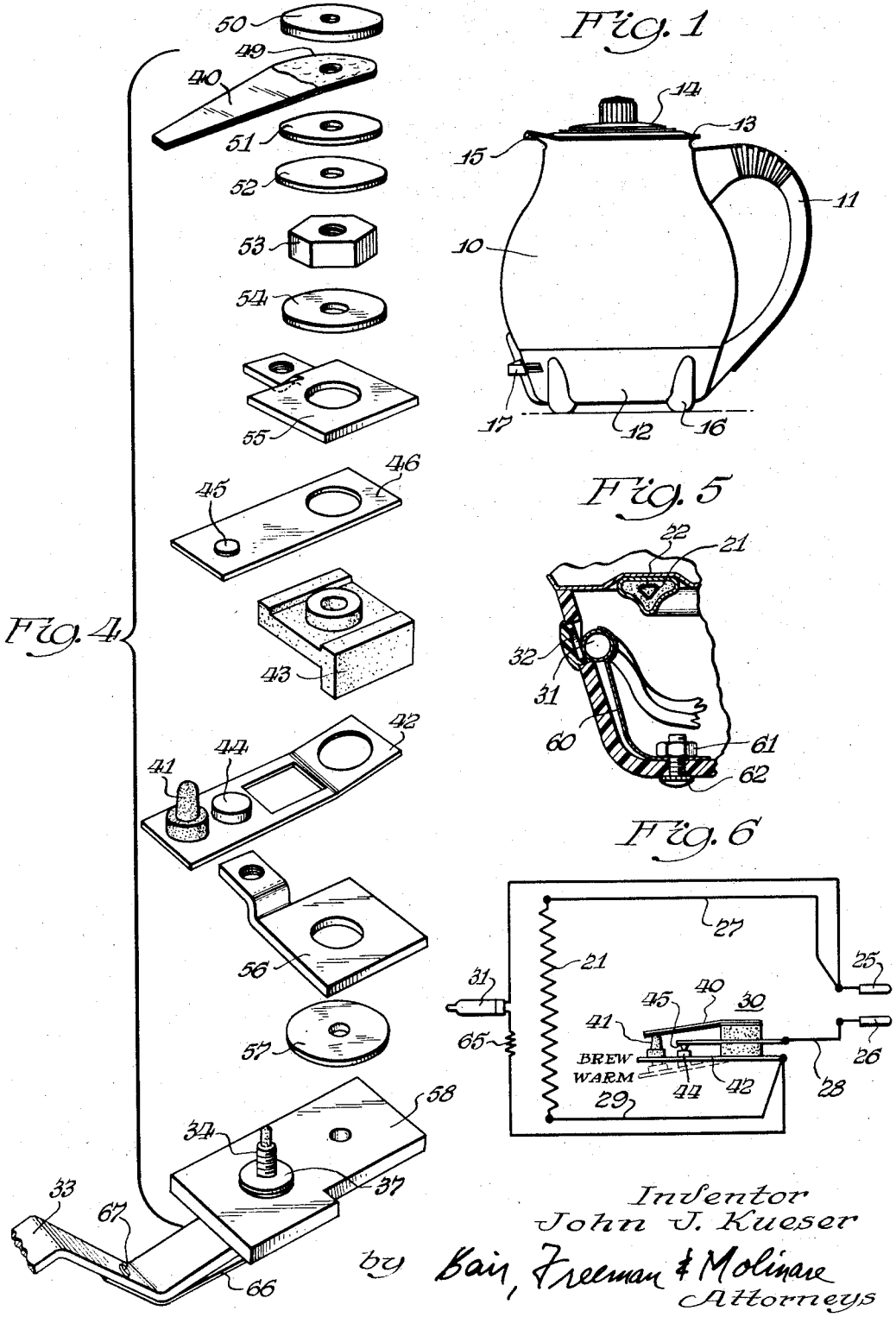
Inventor
John J. Kueser
by Bair, Freeman & Molinare
Attorneys

United States Patent Office 2,896,062
Patented July 21, 1959

2,896,062

COFFEE MAKER AND THERMOSTAT CONSTRUCTION THEREFOR

John Joseph Kueser, St. Louis, Mo., assignor to Knapp-Monarch Company, St. Louis, Mo., a corporation of Delaware Application March 12, 1956, Serial No. 570,929

5 Claims. (Cl. 219—44)

This invention relates generally to electrical appliances for heating liquids and more particularly to the use and construction of temperature control means for such appliances.

Due to the advantages of ease and speed of preparation, the popularity of instant type coffee has grown tremendously in recent years. Manifestly, it is a prime desire of the users of instant type coffee to prepare a coffee brew which tastes like conventionally prepared coffee such as that made from a well-filtered vaculator.

Although in the prior art there are many electrically operated devices for heating liquids such as water, for use in brewing tea, milk drinks, soups, and the like, there exists a need for a device which not only is adaptable to these uses but which in addition enables the preparation of an instant coffee brew in accordance with the above-described desire.

With these objects in view, it has been found that substantially exact temperature control is required, that is, the temperature of the water in the vessel must be raised to a predetermined cut-off temperature before the instant coffee is mixed therewith. More specifically, no more than a few degrees of temperature variation from the predetermined cut-off temperature is desirable. Therefore, the temperature control means of the heating device must function within the foregoing temperature limits for all volumes of liquids within the capacity of the vessel, which for normal purposes may vary from 2 to 12 cups. To this end, maximum possible heat transfer from the water inside the vessel to a thermostat heat sensitive element outside the vessel is required. Further, the thermostat must be mainly responsive to the temperature of the water inside the vessel and not be subject to interference therewith by the heat of the heating elements.

It further has been found that the instant coffee should be stirred into the water when the cut-off temperature has been reached and that after stirring, the temperature of the brew must be reduced several degrees in order to prevent excessive foaming and vaporization.

It is therefore a general object of this invention to provide an improved liquid heating device. More specifically, it is an object of this invention to provide an improved temperature control means for devices adapted to the preparation of instant coffee brews and the like.

It is another object of this invention to provide an improved liquid heating device capable of substantially exact heat control regardless of the volume of liquid within the heated vessel.

It is still another object of this invention to provide an improved liquid heating device having substantially exact temperature control means which include adjustable means for compensating for the effect of altitude on the boiling point of water.

It is still another object of this invention to provide an improved liquid heating device having temperature sensitive heat control means substantially thermally isolated from the heating elements therein, so as to be mainly responsive to the heat of the liquid without interference from the heating elements.

It is still another object of this invention to provide improved temperature control means for an instant coffee maker having a cycle of operation which effects a reduction of temperature of the heated water several degrees after the brew temperature of the water for instant coffee has been attained, said reduction of temperatures being operative to prevent excessive foaming and vaporization.

It is a further object of this invention to provide an improved instant coffee making device that is quick heating and does not require excessive amounts of electrical power, and one that is compact, easy to use, and relatively inexpensive to construct and operate.

Further objects and advantages of the present invention will become apparent as the following description proceeds. The various features of novelty which characterize this invention are pointed out with particularity in the claims annexed to and forming part of the specification. For a better understanding of this invention, however, reference is had to the accompanying drawing and descriptive matter in which is illustrated and described a specific illustrative embodiment of this invention.

In the drawing:

Figure 1 is a side elevational view of a liquid heating device constructed in accordance with the present invention;

Figure 4 is an exploded view in perspective of the thermostat switching structure;

Figure 5 is a fragmentary view showing the indicating apparatus and is taken along lines 5—5 of Figure 2; and Figure 6 is a schematic diagram of the electrical circuits in accordance with the invention.

Figure 2:
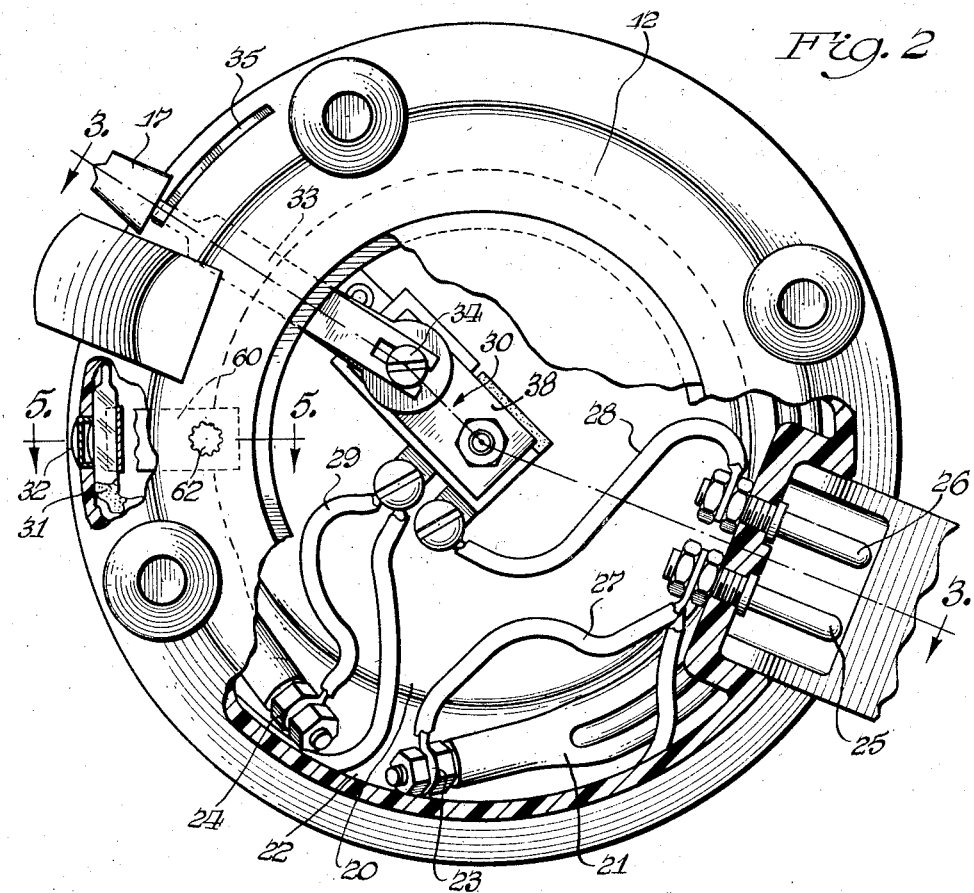
Figure 2 is an enlarged bottom view of the liquid heating device with parts broken away to show the construction of the switch and the heating elements.

Referring now to the structure of Figure 1, the liquid heating device of the present invention consists of a water receiving bowl 10 having a handle 11 and a suitable insulating base 12. Preferably, the top of bowl 10 has a lip 13 adapted to receive a cap 14; and the bowl forms a poring spout 15. Base 12 has a plurality of supporting feet 16 and a socket (not shown) which is adapted to receive an appliance plug. Base 12 also has an adjustable control 17 for permitting user adjustment of the operating temperature of the device as explained in greater detail herein below.

Figure 3:
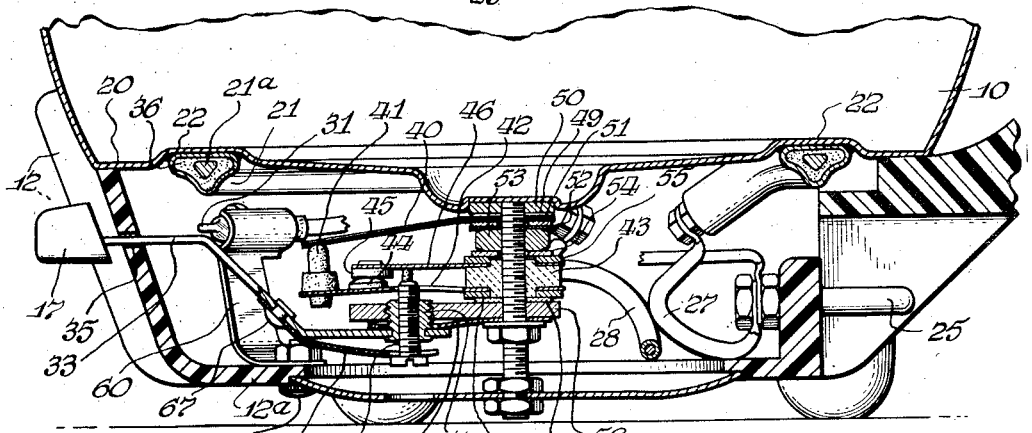
Figure 3 is a view of the switch and heating assembly taken along lines 3—3 of Figure 2.

As shown in Figures 2 and 3, the bottom 20 of the bowl 10 has an annular heating element 21 connected in heat conducting relation thereto. In accordance with an aspect of this invention, heating element 21 is marginally disposed around the bottom 20 of bowl 10 so as to be removed as far as possible from the center thereof. Advantageously, bottom 20 is so constructed that it efficiently conducts heat from heating element 21 to the water within bowl 10. At the same time, the bottom 20 is very thin and, accordingly, is of low-thermal-mass construction to reduce as much as possible, heat flow from heating element 21 towards the center thereof. An annular raised embossment 22 may be provided in the marginal portion of base 20 and heating element 21 may be affixed thereto by welding, brazing, or similar means to provide efficient heat-transfer to the liquid within bowl 10.

The heater wire 21a within heating element 21 advantageously is a high resistance wire embedded in a suitable electrically insulating sleeve 36. The heater wire is energized through a circuit comprising prong 25, conductor 27, heater wire 21a, conductor 29, thermostat assembly 30, conductor 28, and prong 26. The prongs 25 and 26 are adapted to connect to an appliance cord.

Connected in series with thermostat assembly 30 and in parallel with heating element 21 is an indicator lamp 31 disposed at one side of the base 12, the operation of which may be visually observed by the user through an indicator lens 32 positioned within the wall of base 12.

As further explained below, the thermostat assembly may be adjusted to permit the user to set a desired operating temperature over a predetermined range, either for his convenience in setting for his individual preference of drinking temperature, or to permit reheating to almost the boiling point to add more coffee, if he desires to do so. This adjustment is permitted by the manual control 17, adjustably mounted through an elongated slot 35 in the base 12. Control 17 is connected by a link member 33 to a threaded support member 37 positioned in a rigid platform 58. Thus support member 37 is raised and lowered against the bias of resilient member 38 by the movement of control 17. Support member 37 by its action similarly raises and lowers an adjustable screw 34, carried thereby, for selectively varying the point, and thereby the thermostat sensed temperature, at which the temperature controlled switching contacts 44 and 45 are caused to be separated. Also, screw 34 which engages a switch blade 46 carrying contact 45, may be adjusted through a small hole, which advantageously is provided in the bottom plate 12a of base 12, to adjust the position of switch blade 46 to compensate for the effect of altitude on the boiling point of water, as determined by the geographic location of the user.

As shown in Figure 3 of the drawing, the thermostat assembly 30 comprises a bimetal member 40, and an insulator plug 41 disposed in the path of travel of bimetal member 40 and adapted to be operated thereby. Insulator plug 41 is carried by a long switch blade 42 secured in a block insulator member 43. Contact 44 of the thermostat switch assembly also is carried by the long switch blade 42 and is normally biased upwardly thereby into contacting relation with the other contact 45 of the thermostat switch assembly. Contact 45 is carried by a relatively short switch blade 46 supported by block insulator member 43. The point, and thus the thermostat sensed temperature at which switch contacts 44 and 45 are caused to be separated may be varied as explained above, either by adjusting screw 34 which is disposed so as to limit the downward movement of short switch blade 46 or by varying the position of manual control 17 to raise or lower the threaded support 37 which carries screw 34. Screw 34 is prevented from working loose as a result of vibration and the like by a resilient member 66 which at one end thereof exerts a downward bias on the head of screw 34 and at the other end thereof is secured to link member 33 by rivet means 67.

The construction of the stacked thermostat switch assembly is better seen in the exploded view of Figure 4. Positioned directly below the center of the bottom of bowl 10 is a bimetal seating member 50 adapted to seat within a recess provided in the bowl bottom. The bimetal member 40 is placed directly below bimetal seat 50 and, in accordance with an aspect of this invention, a layer of a heat resistant material such as a film of silicone grease 49 is provided therebetween. In the order of their occurrence below bimetal member 40, is a mica washer 51, a conventional washer 52, a lock nut 53, another mica washer 54, a terminal plate 55, the short switch blade 46 which carries switch contact 45, the block insulator member 43, the long switch blade 42, which carries insulator plug 41 and lower switch contact 44 thereon, terminal plate 56, a mica washer 57, and a platform 58 which carries thereon support member 37, the adjustable lever 33 and the adjusting screw 34.

In accordance with a feature of this invention, exact temperature control of the liquid within the bowl is obtained despite wide variations in the volume of such liquid by thermally isolating the thermostat assembly 30 to as great a degree as possible from the annular heating element 21. To this end, maximum heat transfer from the liquid in the bottom of the bowl to the thermostat assembly is required while preventing heat transfer from the heating element 21 to the thermostat. Therefore, the bottom 20 of bowl 10 advantageously is constructed to have good thermal conductivity between heating element 21 and the water in bowl 10, but having very low thermal mass, which limits sensitivity of the thermostat assembly 30 to the heat from heating element 21.

The thermostat assembly 30 is mounted tightly to the center bottom of the bowl. The bimetal seat 50 is brazed to the bottom of bowl 10 and advantageously is designed to have a very smooth surface for a good heat transfer. Bimetal member 40 advantageously has a cuprous center layer between the high expansive layer on one side and the low expansive layer on the other side. A bimetal member of this type has been found to have unusually high thermal conductivity together with high physical strength.

Lock nut 53 preferably is an extra heavy nut which is drawn very tight on stacking bolt 39, such as with torque of 35 inch pounds, to hold the bimetal member 40 in good heat transfer relation to bimetal seat 50. Mica washer 51 is utilized to thermally insulate the heat flow loss away from the mass of the rest of the thermostat assembly. Further, bimetal member 40 is thermally insulated by not being connected to any thermal mass which might possibly conduct heat away from it and create losses. To insure the high degree of accuracy desired for temperature control in accordance with the instant invention, a film of heat resistant silicone grease 49 is provided intermediate bimetal member 40 and bimetal seat 50 to prevent oxidation which would change the thermostat calibration by changing the heat flow to the bimetal member.

It will be appreciated at this point that due to the thermal isolation of the bimetal 40 from the heating element 21 by a bowl bottom of low thermal mass, and from the switch assembly by an insulator plug 41 at one end thereof and the mica washer 51 at the other end thereof together with the maximum possible spacing between the thermostat assembly and the annular heating element 21, the thermostat is responsive primarly to that part of the bowl which attains only the temperature of the water therein and is not responsive to the heating element temperature. It has been found that such an arrangement enables the liquid to be heated to a predetermined cut-off temperature plus or minus two degrees whether the volume of the liquid be two cups, 12 cups, or any amount therebetween.

Further, as explained above, it is desirable to reduce the water temperature several degrees immediately after the cut-off temperature has been reached and the instant coffee has been stirred into the water. This is necessary in order to prevent excessive foaming, or even foaming over the top of the bowl when 12 cup measures of instant coffee are added to the water, and to prevent excessive vaporization. In the instant construction, the high degree of thermal isolation provided between the thermostat and the heating element enables this operation to take place. In practice, the temperature of the water is reduced slightly after the first cut-off due to the fact that the thermostat in the center is responsive to that portion of the water that heats last because the heating element is towards the outside of the bowl and heats the outer section of water first. Thus, there is a lag during the first heating cycle between the water in the center of the bowl and the water at the sides thereof. Manifestly, this lag is present at either a 2 or 12 cup filling but once the water approaches stability, that is, uniformity of temperature, this lag is substantially reduced and results in a lower average temperature of the water after the first cycle of the thermostat.

Figure 5 of the drawing shows the indicator lamp 31 which may be visually observed through the indicator lens 32 mounted in the side wall of the base 12. Preferably the indicator lamp may be held in position with respect to the indicator lens by a resilient clamp member 60 secured to base 12 by a nut 61 and bolt 62.

Figure 6 shows the electrical system of the device. When power is applied to the prongs 25 and 26, current is caused to flow through a first circuit comprising prong 25, the heating element 21, contacts 44 and 45 of the thermostat assembly 30, and prong 26. At the same time and to indicate the heating operation of heating element 21, current is caused to flow from prong 25 through indicator lamp 31, current limiting resistance 65, and thermostat contacts 44 and 45 back to prong 26. When the desired predetermined cut-off temperature is reached, the movement of bimetal member 40 engages insulator plug 41 and causes long switch blade 42 to be depressed, as shown in dotted lines, to open contacts 44 and 45 and thereby deenergize both the heating circuit and the indicating circuit, in accordance with normal operation of the thermostat device. This operation is repeated as understood by those versed in the art to maintain a desired predetermined temperature of the instant coffee brew.

Changes may be made in the construction and arrangement of the parts of the liquid heating device without departing from the real spirit and purpose of my invention, and it is my intention to cover by the claims any modified forms of structure or use of mechanical or electrical improvements which may be reasonably included within their scope.

What I claim as new and desired to obtain by Letters Patent of the United States is:

1. An electrically operated coffee maker comprising the combination of a water receiving vessel having a circular bottom of low thermal mass formed with a water-receiving depression at the geometric center thereof, an annular heating element disposed concentrically about the geometric center of the bottom wall of said vessel and in operative relation therewith, and means including temperature sensitive control elements secured to the bottom wall of said vessel and at the geometric center thereof for providing maximum thermal isolation, through said vessel bottom of low thermal mass, between said heating element and said temperature sensitive control elements, said temperature sensitive control elements including a bimetal member, means for connecting said bimetal member to said bottom wall at the geometric center thereof and in good heat transfer relation thereto for maximizing heat sensing by said bimetal of the true heat of the water in said vessel, said last named means including a layer of heat resistant silicone grease between the vessel and the bimetal member for preventing oxidation thereat, and thermal insulation means connected to said bimetal member on the side thereof away from said vessel for minimizing heat loss therefrom.

2. A thermostat controlled switch comprising, in combination, a pair of contact arms having contacts thereon adapted to be in opened or closed conditions, a first one of said contact arms being biased toward one of said contact conditions, a thermostatically controlled member arranged for engagement with said first contact arm to move said contact arm against said bias to said other contact condition, an annular adjustment screw having screwed engagement with a fixed threaded support, an elonagted adjusting screw having a central portion thereof in screwed engagement in said annular adjustment screw and having both its ends extending axially outwardly of said annular adjustment screw one end of said elongated adjusting screw engaging the other contact arm to vary, and thereby adjust, the position of the contact thereon, a control arm movable with one of said screws, means carried by the other screw providing for adjustment of said other screw, and resilient means carried by said control arm and cooperating with the said other screw for maintaining said other screw in its adjusted position.

3. A thermostat controlled switch comprising, in combination, a pair of contact arms having contacts thereon adapted to be in opened or closed conditions, a first one of said contact arms being biased toward one of said contact conditions, a thermostatically controlled member arranged for engagement with said first contact arm to move said contact arm against said bias to said other contact condition, an annular adjustment screw having screwed engagement with a fixed threaded support, an elongated adjusting screw having a central portion thereof in screwed engagement in said annular adjustment screw and having both its extending axially outwardly of said annular adjustment screw, one end of said elongated adjusting screw engaging the other contact arm to vary, and thereby adjust, the position of the contact thereon, a control arm movable with said annular adjustment screw, and resilient means carried by said control arm and cooperating with the other end of said elongated adjusting screw and with the screwed connection between said elongated adjusting screw and said annular adjustment screw for maintaining said elongated screw in its adjusted position.

4. A thermostat controlled switch comprising, in combination, a pair of contact arms having contacts thereon adapted to be in opened or closed conditions, a first one of said contact arms being biased toward one of said contact conditions, a thermostatically controlled member arranged for engagement with said first contact arm to move said contact arm against said bias to said other contact condition, an annular adjustment screw having screwed engagement with a fixed threaded support, an elongated adjusting screw having a central portion thereof in screwed engagement in said annular adjustment screw and having both its ends extending axially outwardly of said annular adjustment screw, one end of said elongated adjusting screw engaging the other contact arm to vary, and thereby adjust, the position of the contact thereon, a first resilient means cooperating with the other end of said elongated adjusting screw and with the screwed connection between said elongated adjusting screw and said annular adjustment screw for maintaining said elongated screw in its adjusted position, a second resilient means cooperating with the screwed connection between the annular adjustment screw and said fixed support, a control arm movable with one of said screws, and one of said resilient means being carried by said control arm.

5. A thermostat controlled switch comprising, in combination, a pair of contact arms having contacts thereon adapted to be in opened or closed conditions, a first one of said contact arms being biased toward one of said contact conditions, a thermostatically controlled member arranged for engagement with said first contact arm to move said contact arm against said bias to said other contact condition, an annular adjustment screw having screwed engagement with a fixed threaded support, an elongated adjusting screw having a central portion thereof in screwed engagement in said annular adjustment screw and having both its ends extending axially outwardly of said annular adjustment screw, one end of said elongated adjusting screw engaging the other contact arm to vary, and thereby adjust, the position of the contact thereon, a control arm movable with said annular adjustment screw, resilient means carried by said control arm and cooperating with the other end of said elongated adjusting screw and with the screwed connection between said elongated adjusting screw and said annular adjustment screw for maintaining said elongated screw in its adjusted position, and resilient means also cooperating with the screwed connection between the annular adjustment screw and said fixed support.

References Cited in the file of this patent

UNITED STATES PATENTS

| | | |
|---|---|---|
| 1,650,979 | Brace | Nov. 29, 1927 |
| 2,175,727 | Graham | Oct. 10, 1939 |
| 2,231,081 | Maseng | Feb. 11, 1941 |
| 2,546,471 | Meyers | Mar. 27, 1951 |
| 2,678,379 | Fry | May 11, 1954 |
| 2,719,199 | Holmes | Sept. 27, 1955 |
| 2,729,159 | Huck | Jan. 3, 1956 |
| 2,741,682 | Schwaneke | Apr. 10, 1956 |
| 2,807,690 | Schwaneke | Sept. 24, 1957 |

FOREIGN PATENTS

| | | |
|---|---|---|
| 331,621 | Germany | Jan. 10, 1921 |
| 601,041 | Great Britain | Apr. 26, 1948 |
| 624,587 | Great Britain | June 13, 1949 |